US011827745B2

(12) United States Patent
Choi et al.

(10) Patent No.: US 11,827,745 B2
(45) Date of Patent: Nov. 28, 2023

(54) TRIBLOCK COPOLYMER AND PROCESS FOR PREPARATION THEREOF

(71) Applicant: LG CHEM, LTD., Seoul (KR)

(72) Inventors: Jung Yun Choi, Daejeon (KR); Sungwoon Heo, Daejeon (KR); Chul Woong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 311 days.

(21) Appl. No.: 17/266,925

(22) PCT Filed: Mar. 17, 2020

(86) PCT No.: PCT/KR2020/003639
§ 371 (c)(1),
(2) Date: Feb. 8, 2021

(87) PCT Pub. No.: WO2020/197148
PCT Pub. Date: Oct. 1, 2020

(65) Prior Publication Data
US 2021/0340314 A1  Nov. 4, 2021

(30) Foreign Application Priority Data

Mar. 26, 2019 (KR) .......... 10-2019-0034614
Mar. 16, 2020 (KR) .......... 10-2020-0031969

(51) Int. Cl.
C08G 63/685 (2006.01)
C08G 63/85 (2006.01)
C08G 63/82 (2006.01)

(52) U.S. Cl.
CPC ....... *C08G 63/6852* (2013.01); *C08G 63/823* (2013.01); *C08G 63/85* (2013.01); *C08G 2230/00* (2013.01)

(58) Field of Classification Search
CPC ...... C08G 63/08; C08G 63/85; C08G 63/823; C08G 63/6852; C08G 2230/00
See application file for complete search history.

(56) References Cited

U.S. PATENT DOCUMENTS

| | | |
|---|---|---|
| 2002/0161134 A1 | 10/2002 | Kim et al. |
| 2004/0068059 A1 | 4/2004 | Katayama et al. |
| 2006/0182710 A1 | 8/2006 | Hsiue et al. |
| 2008/0221265 A1 | 9/2008 | Sodergard et al. |
| 2010/0222545 A1 | 9/2010 | Park et al. |
| 2011/0046339 A1 | 2/2011 | Park et al. |
| 2012/0045801 A1 | 2/2012 | Yang et al. |
| 2012/0095169 A1 | 4/2012 | Ogawa et al. |
| 2012/0270979 A1 | 10/2012 | Hsu et al. |
| 2013/0184429 A1 | 7/2013 | Pugh et al. |
| 2013/0197186 A1 | 8/2013 | Nagano et al. |
| 2013/0281633 A1 | 10/2013 | Allen |
| 2014/0205638 A1 | 7/2014 | Oh et al. |
| 2016/0208039 A1 | 7/2016 | Yoon et al. |
| 2020/0172680 A1 | 6/2020 | Choi et al. |
| 2020/0270649 A1 | 8/2020 | Kang et al. |
| 2021/0309800 A1 | 10/2021 | Choi et al. |

FOREIGN PATENT DOCUMENTS

| | | | |
|---|---|---|---|
| CN | 1662582 | 8/2005 | |
| CN | 1775827 | 5/2006 | |
| CN | 1927911 | 3/2007 | |
| CN | 101616954 | 12/2009 | |
| CN | 102199271 | 9/2011 | |
| CN | 102307988 | 1/2012 | |
| CN | 102459391 | 5/2012 | |
| CN | 105593256 | 5/2016 | |
| CN | 108250415 | 7/2018 | |
| CN | 108250415 A * | 7/2018 | ............ C08G 63/08 |
| EP | 2719715 A2 | 4/2014 | |
| EP | 2982714 A1 | 2/2016 | |
| JP | S59-062628 A | 4/1984 | |
| JP | S62-131019 A | 6/1987 | |
| JP | H07-090072 A | 4/1995 | |
| JP | H07-316271 | 12/1995 | |
| JP | H0920857 A * | 1/1997 | ............ C08L 101/16 |
| JP | H11-130847 | 5/1999 | |
| JP | 2001-261838 A | 9/2001 | |
| JP | 2002-293986 A | 10/2002 | |
| JP | 2002-338673 A | 11/2002 | |
| JP | 2003-165833 | 6/2003 | |
| JP | 3504704 | 3/2004 | |
| JP | 2005-527678 | 9/2005 | |
| JP | 2006-124595 A | 5/2006 | |
| JP | 2006-188699 A | 7/2006 | |
| JP | 2006183042 A | 7/2006 | |
| JP | 2006-206905 A | 8/2006 | |

(Continued)

OTHER PUBLICATIONS

Hiki et al.; Polymer, 2000, vol. 41, p. 7369-7379.*
H. Kricheldorf et al., "Stereocomplexes of A-B-A Triblock Copolymers Based on Poly(L_Lactide) and Poly(D-Lactide) A Blocks", Macromolecules, American Chemical Society, vol. 38, No. 16, 2005, pp. 7018-7025, XP008166599.
J. Ramier et al., "Microwave-Assisted Synthesis and Characterization of Biodegradable Block Copolyesters Based on Poly(3-hydroxyalkanoate)s and Poly(D,L-lactide)", Journal of Polymer Science Part A: Polymer Chemistry, vol. 50, No. 7, 2012, pp. 1445-1455, XP055743447.
Office Action of Japanese Patent Office in Appl'n No. 2020-570460 dated Jan. 17, 2022.

(Continued)

*Primary Examiner* — Tae H Yoon
(74) *Attorney, Agent, or Firm* — Bryan Cave Leighton Paisner LLP

(57) ABSTRACT

Provided is a triblock copolymer comprising a poly(3-hydroxypropionate) block, and polylactide blocks bonded to both ends of the poly(3-hydroxypropionate) block. Also provided is a method for preparing a triblock copolymer by ring-opening polymerization of lactide monomers in the presence of a poly(3-hydroxypropionate) initiator having hydroxy groups at both ends.

13 Claims, 1 Drawing Sheet

(56) References Cited

FOREIGN PATENT DOCUMENTS

| | | | |
|---|---|---|---|
| JP | 2009-001637 | | 1/2009 |
| JP | 2009-120802 | A | 6/2009 |
| JP | 2010-510371 | | 4/2010 |
| JP | 2010-510372 | A | 4/2010 |
| JP | 4596810 | | 12/2010 |
| JP | 2014-070195 | A | 4/2014 |
| JP | 2014512438 | A | 5/2014 |
| JP | 5584803 | B2 | 9/2014 |
| JP | 2017-129856 | A | 7/2017 |
| JP | 2020-518696 | A | 6/2020 |
| JP | 2020-536546 | A | 12/2020 |
| JP | 2021-529230 | A | 10/2021 |
| KR | 10-2003-0068162 | | 8/2003 |
| KR | 10-2005-0024295 | | 3/2005 |
| KR | 10-2008-046795 | | 5/2008 |
| KR | 10-2009-0090695 | | 8/2009 |
| KR | 20090090695 | * | 8/2009 ............ C08G 63/08 |
| KR | 10-2013-0034997 | | 4/2013 |
| KR | 10-1318734 | | 10/2013 |
| KR | 10-2014-0009138 | | 1/2014 |
| KR | 10-2014-0035882 | | 3/2014 |
| KR | 10-1427459 | | 8/2014 |
| KR | 10-2015-0063367 | | 6/2015 |
| KR | 10-2015-0140166 | | 12/2015 |
| KR | 10-2018-0072481 | | 6/2018 |
| WO | 2012-020992 | | 2/2012 |

OTHER PUBLICATIONS

International Search Report and the Written Opinion of PCT/KR2020/003639, dated Jun. 30, 2020.
U.S. Appl. No. 16/615,625.
Office Action of Chinese Patent Office in Appl'n No. 201880028909.4, dated Mar. 16, 2021.
Andreessen, B. and Steinbuchel, A., "Biosynthesis and Biodegradation of 3-Hydroxypropionate-Containing Polyesters," Applied and Environmental Microbiology 76(15): 4919-4925 (2010).
Ke et al., "Synthetic routes to degradable copolymers deriving from the biosynthesized polyhydroxyalkanoates: A mini review," eXPRESS Polymer Letters 10(1): 36-53 (2016).
Liu et al., "Preparation of Higher Molecular Weight Poly (L-lactic Acid) by Chain Extension," International Journal of Polymer Science 2013(Article ID 315917): 1-6 (2013).
Ren et al., "Microbial synthesis of a novel terpolyester P(LA-co-3HB-co-3HP) from low-cost substrates," Microbial Biotechnology 10(2): 371-380 (2017).
MacDonald et al., "Tuning thermal properties and microphase separation in aliphatic polyester ABA copolymers," Polym. Chem. 6: 1445-1453 (2015).
Lebarbe et al., "Fully bio-based poly(L-lactide)-b-poly(ricinoleic acid)-b-poly(L-lactide) triblock copolyesters: investigation of solid-state morphology and thermo-mechanical properties," Polym. Chem. 4: 3357-3369 (2013).
Ramier et al, "Microwave-Assisted Synthesis and Characterization of Biodegradable Block Copolyesters Based on Poly(3-hydroxyalkanoate)s and Poly(D,L-lactide)," J. Polym Sci Part A: Polym Chem 50: 1445-1455 (2012).
Wu et al., "Synthesis, characterization and biocompatibility of novel biodegradable poly[((R)-3-hydroxybutyrate)-block-(D,L-lactide)-block-(epsilon-caprolactone)] triblock copolymers," Polym Int. 57: 939-949 (2008).
Haynes et al., "In Situ Copolyesters Containing Poly(L-lactide) and Poly(hydroxyalkanoate) Units," Biomacromolecules 8: 1131-1137 (2007).
Zeng et al., "Poly(L-lactic acid)-block-poly(butylene succinate-co-butylene adipate) Multiblock Copolymers: From Synthesis to Thermo-Mechanical Properties," Ind. Eng. Chem. Res. 53: 3550-3558 (2014).
Pitet, L.M. and M. A. Hillmyer, "Combining Ring-Opening Metathesis Polymerization and Cyclic Ester Ring-Opening Polymerization to Form ABA Triblock Copolymers from 1,5-Cyclooctadiene and D,L-Lactide," Macromolecules 42: 3674-3680 (2009).
Masutani K. and Y. Kimura, "PLA Synthesis. From the Monomer to the Polymer," RSC Polymer Chemistry Series No. 12: Chapter 1, pp. 3-36 (2015).

* cited by examiner

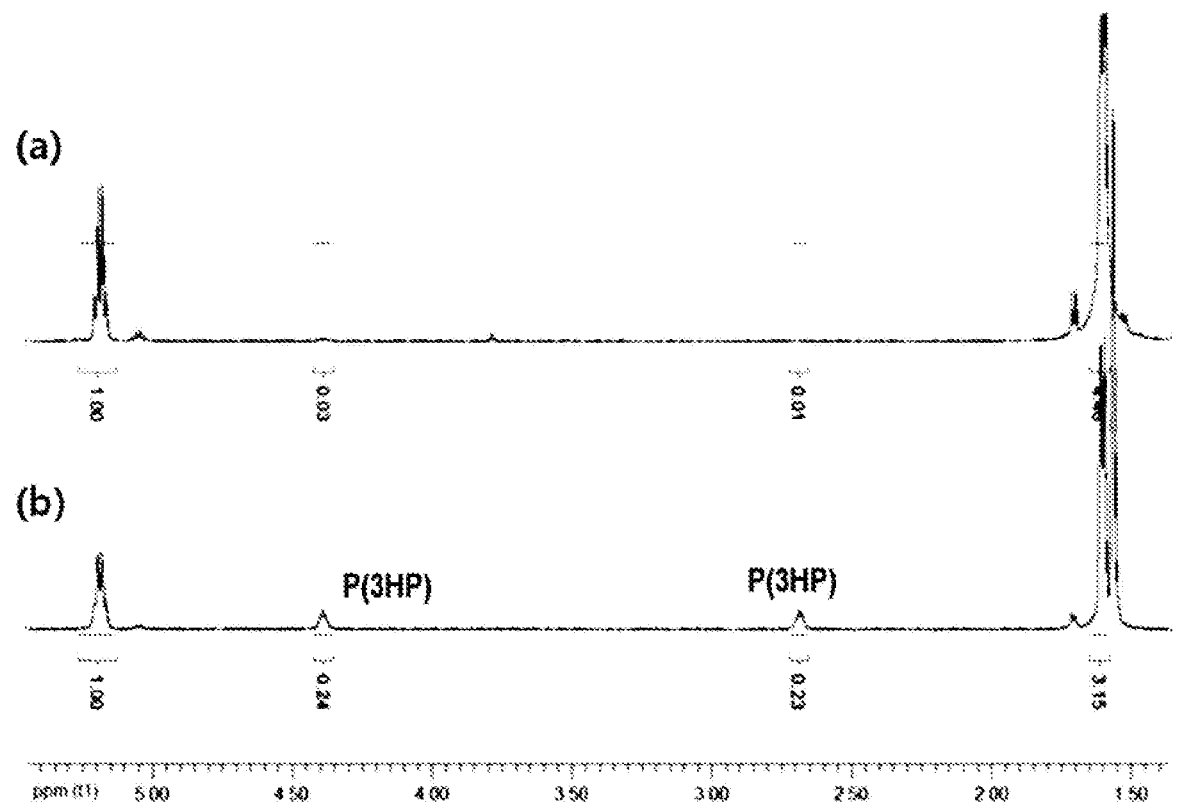

U.S. 11,827,745 B2

TRIBLOCK COPOLYMER AND PROCESS FOR PREPARATION THEREOF

CROSS-REFERENCE TO RELATED APPLICATION(S)

This application is a National Stage Application of International Application No. PCT/KR2020/003639 filed on Mar. 17, 2020, which claims priority to Korean Patent Application No. 10-2019-0034614 filed on Mar. 26, 2019 and Korean Patent Application No. 10-2020-0031969 filed on Mar. 16, 2020 with the Korean Intellectual Property Office, the disclosures of which are incorporated herein by reference in their entirety.

TECHNICAL FIELD

The present disclosure relates to a triblock copolymer and a method for preparing the same.

BACKGROUND

Polylactide (or polylactic acid) resin is a plant-derived resin obtained from plants such as corn, and is attracting attention as an environment-friendly material having excellent tensile strength and elastic modulus while having biodegradable properties. Specifically, unlike petroleum-based resins such as polystyrene resin, polyvinyl chloride (PVC) resin, and polyethylene that have been used in the past, polylactide (or polylactic acid) resin has the effects of preventing the depletion of petroleum resources and suppressing carbon dioxide emissions, so it can reduce environmental pollution, which is a drawback of petroleum-based plastic products. Therefore, as the problem of environmental pollution caused by waste plastic, etc. has emerged as a social problem, it has been attempted to expand the scope of application to the fields of the products where general plastics (petroleum-based resins) were used, such as food packaging materials and containers, and electronic product cases.

However, the polylactide resin has a lower impact resistance and heat resistance than conventional petroleum-based resins, and thus its application range is limited. Further, the polylactide resin has poor elongation characteristics and easily exhibits brittleness, which has a limitation as a general-purpose resin.

Therefore, in the existing technology, research is underway to improve physical properties by compounding materials such as PBS (poly(butylene succinate)) and PBAT (poly(butylene adipate-co-terephthalate)), which are biodegradable and have relatively excellent elongation characteristics, with polylactide, or by forming block copolymers. However, in the case of PBS and PBAT, there is a problem that the tensile strength is low, and the tensile strength of the compound or block copolymer is also lowered.

In addition, there have been attempts to form a copolymer of biodegradable polyhydroxyalkanoate (PHA) and a polylactic acid in the related art, there is a problem that crystallinity is not maintained, and thus, the tensile strength is rather reduced.

DETAILED DESCRIPTION

Technical Problem

It is one object of the present disclosure to provide a triblock copolymer excellent in mechanical properties such as tensile modulus, tensile strength, elongation at break and impact strength while maintaining environmental friendliness and biodegradability, and a method for preparing the same.

Technical Solution

Provided herein is a triblock copolymer comprising: a poly(3-hydroxypropionate) block and a polylactide block bonded to both ends of the poly(3-hydroxypropionate) block, respectively.

Also provided herein is a method for preparing a triblock copolymer comprising subjecting a lactide monomer to a ring-opening polymerization in the presence of a poly(3-hydroxypropionate) initiator having hydroxy groups at both ends to prepare a triblock copolymer.

Hereinafter, a triblock copolymer and a method for preparing the same according to specific embodiments of the present disclosure will be described in more detail.

Unless particularly mentioned herein, the term "including" or "containing" refers to including any element (or component) without any limitation, and should not be construed as excluding addition of other elements (or components).

Also, throughout the present specification, the term "lactide monomer" can be defined as follows. Typically, lactides can be classified into L-lactide consisting of L-lactic acid, D-lactide consisting of D-lactic acid, and meso-lactide consisting of one L-type and one D-type. Also, a mixture of L-lactide and D-lactide in a weight ratio of 50:50 is referred to as D,L-lactide or rac-lactide. Among these lactides, the polymerization proceeding only with either of L-lactide and D-lactide that have a high level of optical purity is known to yield an L- or D-polylactide (PLLA or PDLA) with a high level of stereoregularity. Such polylactides have a faster crystallization rate and a higher crystallization degree than a polylactide having a low level of optical purity. However, the term "lactide monomer" is defined to include all types of lactides regardless of the difference in the characteristics of lactides depending on their types and the difference in the characteristics of the polylactides obtained therefrom.

And, throughout the present specification, the term "substituted or unsubstituted" means being unsubstituted or substituted with one or more substituents selected from the group consisting of deuterium; a halogen group; a nitrile group; a nitro group; a hydroxy group; a carbonyl group; an ester group; an imide group; an amino group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkylamine group; an aralkylamine group; a heteroarylamine group; an arylamine group; an arylphosphine group; and a heterocyclic group containing at least one of N, O and S atoms, or being unstibstituted or substituted with a substituent to which two or more substituents of the above-exemplified substituents are connected. For example, "a substituent in which two or more substituents are connected" can be a biphenyl group. Namely, a biphenyl group can be an aryl group, or it can be interpreted as a substituent in which two phenyl groups are connected.

Further, throughout the present specification, the term "triblock copolymer" refers to a polylactide-poly(3-hydroxypropionate)-polylactide triblock copolymer containing a polylactide repeating unit and a poly(3-hydroxypropionate) repeating unit. In particular, the poly(3-hydroxypropionate) repeating unit has a specific linking group including an amide. Such polylactide-poly(3-hydroxypropionate)-polylactide triblock copolymer can be prepared by a process including forming the polylactide repeating unit and the poly(3-hydroxypropionate) repeating unit by the ring-opening polymerization of a "lactide monomer" in the presence of a poly(3-hydroxypropionate) initiator having hydroxy groups at both ends. The polymer obtained after the completion of such ring opening polymerization and the formation of the repeating unit can be referred to as the "triblock copolymer". In this case, as stated above, the category of the "lactide monomer" includes any types of lactides.

Further, in the category of the polymer that can be referred to as the "triblock copolymer", all the polymers can be included in any state after the completion of the ring opening polymerization and the formation of the repeating unit, for example, unpurified or purified polymers after the completion of the ring opening polymerization, the polymers contained in the liquid or solid resin composition prior to being molded into an article, or the polymers contained in plastics or woven materials after being molded into an article. Accordingly, throughout the present specification, the physical properties (weight average molecular weight, or the like) of the "triblock copolymer" can be defined by the physical properties of the polymer in any state after the completion of the ring opening polymerization and the formation of the repeating unit.

On the other hand, the present inventors have found that when a triblock copolymer including a specific poly(3-hydroxypropionate)block and a polylactide block bonded to both ends of the poly(3-hydroxypropionate)block, respectively, is excellent in mechanical properties such as tensile modulus, tensile strength, elongation at break and impact strength while maintaining environmental friendliness and biodegradability, and also, such a triblock copolymer can be prepared by a process including subjecting a lactide monomer to a ring-opening polymerization in the presence of a poly(3-hydroxypropionate) initiator having hydroxy groups at both ends, thereby completing the present disclosure.

According to one embodiment of the present disclosure, there is provided a triblock copolymer comprising: a poly (3-hydroxypropionate) block of the following Chemical Formula 1, and a polylactide block bonded to both ends of the poly(3-hydroxypropionate) block, respectively:

Chemical Formula 1

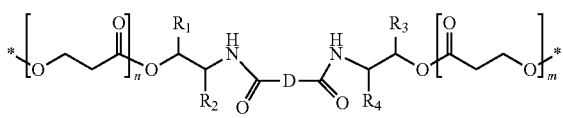

wherein in Chemical Formula 1:

D is a substituted or unsubstituted $C_{1-10}$ alkylene; a substituted or unsubstituted $C_{6-60}$ arylene; or a substituted or unsubstituted $C_{2-60}$ heteroarylene containing at least one heteroatom selected from the group consisting of O, N, Si and S;

$R_1$ to $R_4$ are each independently hydrogen; halogen; hydroxy; cyano; nitrile; nitro; amino; a substituted or unsubstituted $C_{1-60}$ alkyl; a substituted or unsubstituted $C_{1-60}$haloalkyl; a substituted or unsubstituted $C_{1-60}$ thioalkyl; a substituted or unsubstituted $C_{1-60}$ alkoxy; a substituted or unsubstituted $C_{1-60}$ haloalkoxy; a substituted or unsubstituted $C_{3-60}$ cycloalkyl; a substituted or unsubstituted $C_{1-60}$ alkenyl; a substituted or unsubstituted $C_{6-60}$ aryl; a substituted or unsubstituted $C_{6-60}$ aryloxy; or a substituted or unsubstituted $C_{2-60}$ heteroaryl containing at least one of O, N, Si and S; and ln and m are each independently an integer from 1 to 10000.

The poly(3-hydroxypropionate) oligomer contained in the poly(3-hydroxypropionate) block has excellent mechanical properties and has a low glass transition temperature (Tg) of about −20° C., thereby exhibiting high elongation at break characteristics. Therefore, the triblock copolymer of the one embodiment has a structure in which due to the poly(3-hydroxypropionate) block of Chemical Formula 1 and the polylactide block chemically bonded to each of both ends thereof, it can solve the problem of elongation characteristics of conventional polylactide resins, and exhibit excellent mechanical properties such as tensile strength while having excellent biodegradability.

The triblock copolymer according to the one embodiment can include 0.01 to 100% by weight, 0.1 to 90% by weight, 0.5 to 80% by weight, or 0.7 to 70% by weight of the poly(3-hydroxypropionate) block of Chemical Formula 1.

The triblock copolymer according to the one embodiment can have a weight average molecular weight of 10,000 to 400,000, 15,000 to 350,000, 20,000 to 300,000, or 25,000 to 250,000.

As described above, in the case of the conventional polylactide resin, it has been in the spotlight due to its mechanical properties that are relatively excellent as a biodegradable resin, but due to its high tensile modulus value, that is, the brittleness of the resin itself, there was a limit to applying it to multiple products. On the other hand, since the polylactide-poly(3-hydroxypropionate)block copolymer according to the one embodiment exhibits excellent mechanical properties such as tensile strength and elongation while being excellent in flexibility, the brittleness problem of conventional polylactide resins can be solved and its application fields can be expanded.

According to another embodiment of the present disclosure, there is provided a method for preparing a triblock copolymer comprising subjecting a lactide monomer to a ring-opening polymerization in the presence of a poly(3-hydroxypropionate) initiator having hydroxy groups at both ends to prepare a triblock copolymer.

In general, the polymerization reaction of a polylactide resin by the ring-opening polymerization of a lactide monomer is initiated by a compound having a hydroxy group at the end, and is carried out by successively ring-opening and inserting a lactide monomer into the compound having a hydroxy group at the end.

Therefore, the poly(3-hydroxypropionate) initiator includes a hydroxy group at both ends. Thus, when the hydroxy group at both ends of the poly(3-hydroxypropionate) initiator is added to the ring-opening polymerization reaction of the lactide monomer, the lactide monomer starts to be inserted from the end, and as a result, a polylactide-poly(3-hydroxypropionate) block copolymer can be prepared.

Therefore, when the ring-opening polymerization reaction of the lactide monomer is performed in the presence of the poly(3-hydroxypropionate) initiator having hydroxy groups at both ends, the poly(3-hydroxypropionate) having hydroxy groups at both ends serves as a polymerization initiator and at the same time, is included as a repeating unit in the triblock copolymer, thus making it possible to improve mechanical properties such as flexibility and impact strength of the finally prepared block copolymer. As described above, since the poly(3-hydroxypropionate) is included in the finally prepared triblock copolymer, it is possible to lower the glass transition temperature (Tg) of the triblock copolymer and thus increase the flexibility, and further improve mechanical properties such as tensile modulus, tensile strength, elongation at break and impact strength.

In addition, since the initiator has a hydroxy group at both ends, it has an advantage that it is easy to improve the molecular weight of the block copolymer finally prepared by ring-opening polymerization, as compared with an initiator including a hydroxy group only at one end.

In the preparation method according to another embodiment, the poly(3-hydroxypropionate) initiator having hydroxy groups at both ends can have the following Chemical Formula 2:

Chemical Formula 2

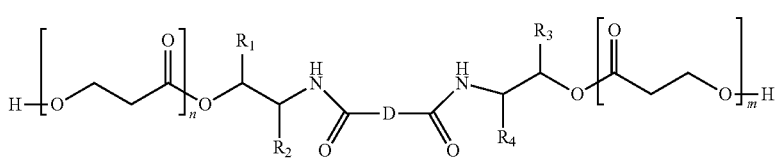

wherein in Chemical Formula 2, D, $R_1$ to $R_4$, n and m are the same as defined above, and specifically, D can be a $C_{6-10}$ arylene.

Further, $R_1$ to $R_4$ can be hydrogen.

In addition, the ratio of n and m can be 1:0.01 to 1:100.

On the other hand, the dosage of the poly(3-hydroxypropionate) initiator having hydroxy groups at both ends can be selected within an appropriate range in consideration of the content of the repeating unit of the poly(3-hydroxypropionate) contained in the finally prepared triblock copolymer and the molar ratio of the hydroxy group of the initiator required to initiate the minimum polymerization. Specifically, in consideration of the minimum content for optimizing the flexibility and mechanical properties of the finally prepared triblock copolymer, and acting as an initiator of the ring-opening polymerization reaction, the poly(3-hydroxypropionate) initiator having hydroxy groups at both ends can be added in an amount of 0.1 to 100 parts by weight, 0.1 to 90 parts by weight, 0.5 to 80 parts by weight, or 0.7 to 70 parts by weight based on 100 parts by weight of the lactide monomer.

The poly(3-hydroxypropionate) initiator having hydroxy groups at both ends can have a weight average molecular weight of 5,000 to 50,000, 6,000 to 40,000, or 7,000 to 30,000 in order to exhibit excellent physical properties of the triblock copolymer without deteriorating polymerization activity. When the weight average molecular weight of the poly(3-hydroxypropionate) initiator having hydroxy groups at both ends is less than 5.000, the content of poly(3-hydroxypropionate) can be reduced, and when the weight average molecular weight exceeds 50,000, the polymerization activity can be reduced.

On the other hand, the preparation method according to the one embodiment can further include preparing the poly(3-hydroxypropionate) initiator having hydroxy groups at both ends before the ring-opening polymerization step.

Specifically, 3-hydroxypropionate can be subjected to condensation polymerization to prepare a poly(3-hydroxypropionate) oligomer. In this case, the poly(3-hydroxypropionate) oligomer can have a weight average molecular weight of 2,000 to 30,000, or 3,000 to 25,000.

Subsequently, the poly(3-hydroxypropionate) oligomer; one or more selected from the group consisting of bisoxazoline-based compounds and diol-based compounds can be reacted. Through this reaction, a poly(3-hydroxypropionate) initiator having hydroxy groups at both ends can be prepared.

The poly bisoxazoline-based compound can have the following Chemical Formula 3:

Chemical Formula 3

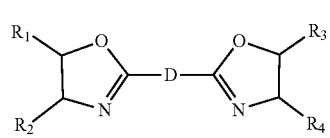

wherein in Chemical Formula 3, D, $R_1$ to $R_4$, n and m are the same as defined above, and specifically, D can be a $C_{6-10}$ arylene.

Further, $R_1$ to $R_4$ can be hydrogen.

Further, the ratio of n and m can be 1:0.01 to 1:100.

The poly(3-hydroxypropionate) oligomer and the bisoxazoline-based compound can be reacted according to the following Reaction Scheme 1 to form a poly(3-hydroxypropionate) initiator having hydroxy groups at both ends, and specifically, an initiator of Chemical Formula 2 can be prepared:

Reaction Scheme 1

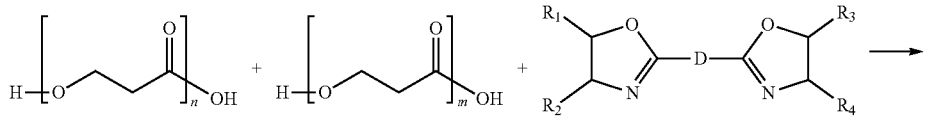

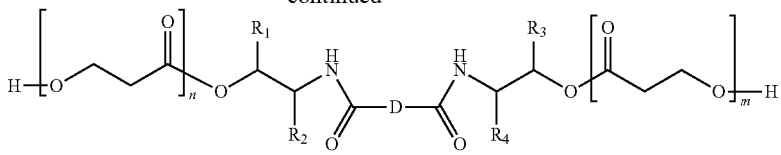

wherein in Reaction Scheme 1, D, $R_1$ to $R_4$, n and m are the same as defined above.

The reaction of Reaction Scheme 1 is performed by the ring-opening addition reactions of oxazoline, and this ring-opening addition reaction can proceed with the carboxylic acid of the poly(3-hydroxypropionate) oligomer. Specifically, the proton of the carboxylic acid interacts with the nitrogen atom of the oxazoline ring, whereby the electron-deficient oxazoline ring is susceptible to nucleophilic attack on the carbon next to the oxygen atom. The proton-released carboxylic acid can nucleophilically attack the carbon next to the oxygen atom to perform the ring opening addition reaction of the above-mentioned oxazoline.

Since the bisoxazoline-based compound undergoes a ring-opening addition reaction with the carboxylic acid of the poly(3-hydroxypropionate) oligomer in each oxazoline ring, finally, a poly(3-hydroxypropionate) initiator having hydroxy groups at both ends of Formula 2 can be prepared.

The bisoxazoline-based compound is not particularly limited as long as it is a compound having two oxazoline rings, and for example, it can be one or more compounds selected from the group consisting of 1,4-phenylenebisoxazoline, 2,2'-bisoxazoline, N,N'-hexamethylenebis(2-carbamoyl-2-oxazoline), 2,2'-methylenebis(2-oxazoline), 2,2'-ethylenebis (2-oxazoline), 2,2 '-propylenebis(2-oxazoline), 1,3-phenylenebi s-(2-oxazoline), 1,4-phenylenebis(4-methyl-2-oxazoline), 1,4-phenylene-bis(4,4'-dimethyl-2-oxazoline), 1,4-phenylenebis (2-oxazoline), 2,2'-bis(4-phenyl-2-oxazoline) and 2,2'-bis(4-methyl-2-oxazoline).

On the other hand, the diol-based compound is not particularly limited as long as it is a compound containing two hydroxyl groups, and for example, it can be one or more compounds selected from the group consisting of ethylene glycol, propylene glycol, 2-methylene 1,3-propnane diol, 1,4-butane diol, 1,5-pentane diol, 3-methylene 1,5-pentane diol and 1,6-hexane diol.

After preparing a poly(3-hydroxypropionate) initiator having hydroxy groups at both ends, the reactant including the initiator and a lactide monomer is dried, and the dried reactant can be subjected to a ring-opening polymerization step to prepare a triblock copolymer.

As the catalyst used in the ring-opening polymerization, all catalysts generally used in the preparation of a polylactide resin by the ring-opening polymerization of a lactide monomer can be used. For example, the ring-opening polymerization can be performed in the presence of one or more catalysts selected from the group consisting of an organometallic complex catalyst and an organic catalyst.

The organometallic complex catalyst can be used without limitation in its composition, as long as it is generally used for preparing a polylactide resin by a ring-opening polymerization of a lactide monomer. For example, the organometallic complex catalyst can be a catalyst of the following Chemical Formula 4:

$MA^1{}_p A^2{}_{2-p}$      Chemical Formula 4 wherein in Chemical Formula 4:
M is Al, Mg, Zn, Ca, Sn, Fe, Y, Sm, Lu, Ti or Zr;
p is an integer from 0 to 2; and
$A^1$ and $A^2$ are each independently an alkoxy or carboxyl group.

More specifically, $MA^1{}_p A^2{}_{2-p}$ can be tin (II) 2-ethylhexanoate $(Sn(Oct)_2)$.

On the other hand, the organic catalyst can be used without limitation in its composition as long as it is generally used for preparing a polylactide resin by a ring-opening polymerization reaction of a lactide monomer. For example, the organic catalyst can be one or more compounds selected from the group consisting of the following 1,5,7-triazobicyclo-[4,4,0]dec-5-ene (TBD), the following 1,8-diazabicyclo[5.4.0]undec-7-ene (DBU), the following 7-methyl-1,5,7-triazabicyclo[4.4.0]dec-5-ene (MTBD), the following 4-dimethylaminopyridine (DMAP), the following 4-(1-pyrrolidinyl)pyridine (PPY), imidazole, triazolium, thiourea, tertiary amine and creatinine:

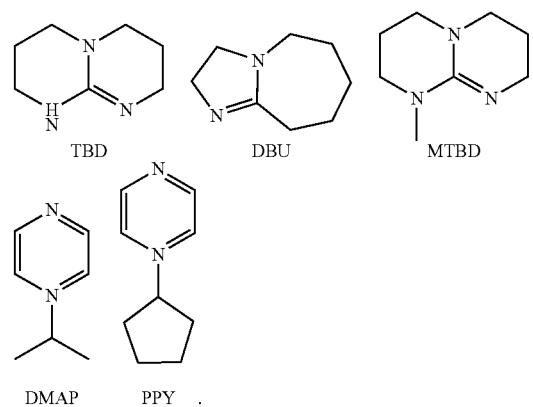

The imidazole can be one or more compounds selected from the group consisting of the following compounds:

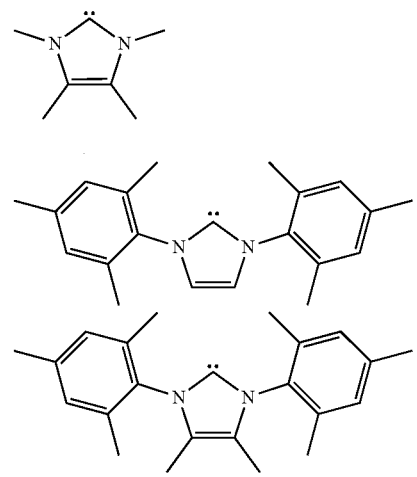

-continued

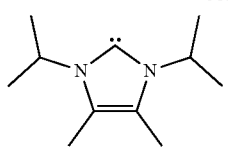

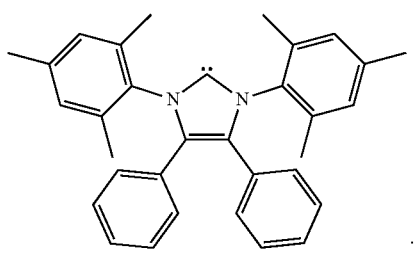

R = CH₃
R = CH(CH₃)
R = C(CH₃)₃
R = adamantyl

The triazolium can be the following compound:

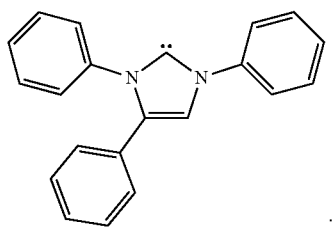

The thiourea can be one or more compounds selected from the group consisting of the following compounds:

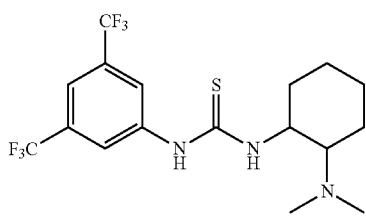

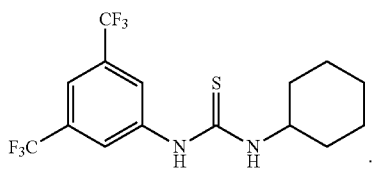

The tertiary amine can be one or more compounds selected from the group consisting of the following compounds:

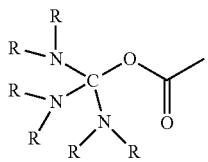

R = CH₃
R = CH(CH₃)
R = C(CH₃)₃
R = adamantyl

When the lactide ring-opening polymerization reaction proceeds in the presence of the above-mentioned catalyst, depolymerization or decomposition of the finally prepared triblock copolymer can be suppressed, and a triblock copolymer having a higher molecular weight and excellent mechanical properties can be obtained with a higher conversion rate.

In the method for preparing a triblock copolymer according to the other embodiment, the content of the catalyst can be 0.01 to 10 mol %, 0.05 to 8 mol %, 0.07 to 5 mol %, or 0.09 to 3 mol % based on 100 mol % of the lactide monomer. When the content of the catalyst relative to 100 mol % of the lactide monomer is less than 0.01 mol %, polymerization activity may not be sufficient, and when the content of the catalyst exceeds 10 mol %, the residual catalyst amount of the prepared triblock copolymer becomes larger, which can lead to decomposition or molecular weight reduction of the copolymer due to depolymerization such as transesterification reaction.

The ring-opening polymerization can be performed at 150 to 200° C. for 5 to 10 hours.

Further, the ring-opening polymerization reaction can be performed by bulk polymerization using substantially no solvent. At this time, using substantially no solvent can include an embodiment of using a small amount of solvent for dissolving the catalyst, for example, up to the embodiment of using less than 1 ml of solvent per 1 kg of lactide monomer used. As the ring-opening polymerization proceeds by bulk polymerization, it becomes possible to omit the process for removing the solvent after polymerization, and decomposition or loss of the resin in such a solvent removal process can also be suppressed. In addition, by the bulk polymerization, the triblock copolymer can be obtained with high conversion and yield.

Advantageous Effects

According to the present disclosure, a triblock copolymer having excellent mechanical properties such as tensile modulus, tensile strength, elongation at break and impact strength while maintaining environmental friendliness and biodegradability, and a method for preparing the same can be provided.

BRIEF DESCRIPTION OF THE DRAWINGS

FIG. 1a is a graph showing the results of NMR analysis of the polymer prepared in Comparative Example 1, and FIG. 1b is a graph showing the results of NMR analysis of the triblock copolymer prepared in Example 3.

EXAMPLES

Hereinafter, the present disclosure will be described in more detail by way of examples. However, the following examples are for illustrative purposes only, and the contents of the present disclosure are not limited thereby.

Examples 1 to 4

(1) Preparation of Poly(3-hydroxypropionate) Initiator Having Hydroxy Groups at Both Ends 7 g (77.71 mmol) of 3-hydroxypropionate was dried, and then subjected to condensation polymerization in the presence of p-toluene sulfonic acid (p-TSA) catalyst at a temperature of 130° C. for 24 hours to prepare a poly(3-hydroxypropionate) oligomer (weight average molecular weight of 4,150).

4 g (1.65 mmol) of the prepared poly(3-hydroxypropionate) oligomer and 0.28 g (1.32 mmol) of 1,4-phenylenebisoxazoline (1,4-PBO) were added to a 250 mL round flask, and reacted at 110° C. for 30 minutes to prepare a poly(3-hydroxypropionate) initiator (weight average molecular weight of 10,100) having hydroxy groups at both ends of the following Chemical Formula 5:

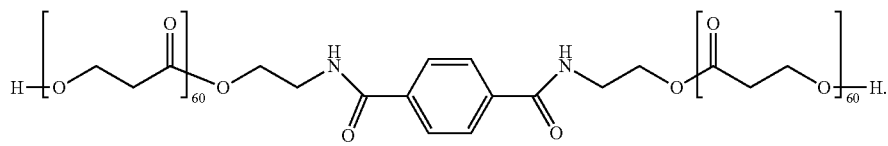

Chemical Formula 5

(2) Preparation of Triblock Copolymer

To a 500 mL round flask, L-lactide, poly(3-hydroxypropionate) initiator of Chemical Formula 5 having hydroxy groups at both ends, and tin(II) 2-ethylhexanoate were added in the amounts shown in Table 1 below, and vacuum-dried at room temperature for 4-5 hours by applying a vacuum sufficiently.

Subsequently, the flask was placed in an oil bath preheated to 130° C., the temperature of which was raised to 180° C., and then the ring-opening polymerization reaction was carried out for 20 minutes. After the reaction was completed, the reaction product was dissolved in chloroform and then extracted with methanol to recover the block copolymer.

TABLE 1

| (unit: g) | L-lactide | Tin(II) 2-ethylhexanoate | Initiator of Chemical Formula 5 |
| --- | --- | --- | --- |
| Example 1 | 16.00 | 0.02 | 0.16 |
| Example 2 | 16.00 | 0.02 | 0.80 |
| Example 3 | 16.00 | 0.02 | 1.60 |
| Example 4 | 16.00 | 0.02 | 0.48 |

Comparative Examples 1 and 2

To a 500 mL round flask, L-lactide, dodecanol, and tin(II) 2-ethylhexanoate were added in the amounts shown in Table 2 below, and vacuum-dried at room temperature for 4-5 hours by applying a vacuum sufficiently.

Subsequently, the flask was placed in an oil bath preheated to 130° C., the temperature of which was raised to 180° C., and then a ring-opening polymerization reaction was carried out for 20 minutes. After the reaction was completed, the reaction product was dissolved in chloroform and then extracted with methanol to recover the polymer.

TABLE 2

| (unit: g) | L-lactide | Tin(II) 2-ethylhexanoate | Dodecanol |
| --- | --- | --- | --- |
| Comparative Example 1 | 16.00 | 0.02 | 0.01 |
| Comparative Example 2 | 16.00 | 0.02 | 0.02 |

Evaluation

1. NMR (Nuclear Magnetic Resonance) Analysis

NMR analysis was performed at room temperature using an NMR spectrometer including a Varian Unity Inova (500 MHz) spectrometer having a triple resonant 5 mm probe. The block copolymers and polymers prepared in Examples 1 to 4 and Comparative Example 1, respectively, were diluted to a concentration of about 10 mg/ml and used as an analysis target material in a solvent for NMR measurement ($CDCl_3$), and chemical shifts were expressed in ppm.

FIG. 1a is a graph showing the results of NMR analysis of the polymer prepared in Comparative Example 1, and FIG. 1b is a graph showing the results of NMR analysis of the triblock copolymer prepared in Example 3. On the other hand, according to FIG. 1a and FIG. 1b, it was confirmed that the NMR analysis graph of the block copolymer of Example 3 shows a poly(3-hydroxypropionate) peak, unlike the NMR analysis graph of the polymer of Comparative Example 1.

In addition, the integration ratio of the poly(3-hydroxypropionate) peak was calculated from the graphs of the NMR analysis results of Examples 1 to 4, which is shown in the "content of poly(3-hydroxypropionate) analyzed by NMR" in Table 3 below.

TABLE 3

| | Example 1 | Example 2 | Example 3 | Example 4 |
| --- | --- | --- | --- | --- |
| Content of initiator of Chemical Formula 5 actually used | 0.160 g | 0.800 g | 1.600 g | 0.480 g |
| Content of poly(3-hydroxypropionate) analyzed by NMR | 0.224 g | 1.120 g | 1.760 g | 0.752 g |

According to Table 3, Examples 1, 2 and 4 also showed a poly(3-hydroxypropionate) peak in NMR analysis, as in Example 3. In particular, it can be predicted that the initiator used in the method for preparing the block copolymer of Examples 1 to 4 was mostly used as the reactant.

2. GPC (Gel Permeation Chromatography) Analysis

The weight average molecular weight (Mw) and number average molecular weight (Mn) of the block copolymers of Examples 1 to 4 and the polymers of Comparative Examples 1 and 2 were determined by gel permeation chromatography (GPC) (Waters: Waters707). The block copolymer/polymer to be measured was dissolved in chloroform to a concentration of 4000 ppm, and 100 μl was injected into GPC. Chloroform was used as the mobile phase of GPC, the flow rate was 1.0 mL/min, and the analysis was performed at 35° C. The column connected four Waters HR-05,1,2,4E in series. RI and PAD Detector was used as the detector, and the measurement was performed at 35° C.

TABLE 4

|  | $Mn_{theoretical}$ | Number average molecular weight (Mn) | Weight average molecular weight (Mw) | Polydispersity Index (PDI) |
|---|---|---|---|---|
| Example 1 | 163,474 | 90,200 | 123,000 | 1.36 |
| Example 2 | 33,991 | 59,100 | 82,300 | 1.39 |
| Example 3 | 17,805 | 48,700 | 63,100 | 1.30 |
| Example 4 | 55,763 | 86,300 | 131,000 | 1.52 |
| Comparative Example 1 | 288,186 | 91,731 | 180,524 | 1.97 |
| Comparative Example 2 | 144,186 | 55,984 | 115,050 | 2.06 |

According to Table 4, it was confirmed that dodecanol was used as an initiator in Comparative Examples 1 and 2, and that as the content of dodecanol increased, the number average molecular weight and the weight average molecular weight of the polymer decreased. Similarly, it was confirmed that in Examples 1 to 4, as the content of poly(3-hydroxypropionate) disclosed in Table 1 increased, the number average molecular weight and weight average molecular weight of the block copolymer decreased, so that poly(3-hydroxypropionate) acts as an initiator.

3. Measurement of Tensile Elongation

The polymers obtained in Examples 2, 4 and Comparative Example 1 were used, and a Hot-press (Limotem QM900S) device was used to prepare a dogbone shaped test specimen corresponding to ASTM D638 Type V at 170° C.

The tensile elongation of the film was measured according to the measurement method of IPC-TM-650 using a tensile strength meter (manufacturer: Instron, model name: 3345 UTM) for the prepared test specimen.

TABLE 5

|  | Example 2 | Example 4 | Comparative Example 1 |
|---|---|---|---|
| Tensile elongation (%) | 80 | 13.5 | 2.5 |

According to Table 5, it was confirmed that the copolymers of Examples 2 and 4, in which L-lactide was subjected to a ring-opening polymerization in the presence of a poly(3-hydroxypropionate) initiator, exhibited a remarkably higher tensile elongation than Comparative Example 1, in which L-lactide was subjected to a ring opening polymerization in the presence of dodecanol.

The invention claimed is:

1. A triblock copolymer comprising:
   a poly(3-hydroxypropionate) block of the following Chemical Formula 1; and
   a polylactide block bonded to both ends of the poly(3-hydroxypropionate) block, respectively,

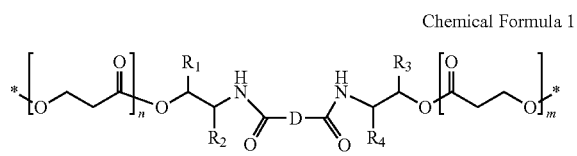

Chemical Formula 1 wherein in Chemical Formula 1:
D is a substituted or unsubstituted $C_{1-10}$ alkylene; a substituted or unsubstituted $C_{6-60}$ arylene; or a substituted or unsubstituted $C_{2-60}$ heteroarylene containing at least one heteroatom selected from the group consisting of O, N, Si and S;

$R_1$ to $R_4$ are each independently hydrogen, halogen, hydroxy, cyano, nitrile, nitro, amino, a substituted or unsubstituted $C_{1-60}$ alkyl, a substituted or unsubstituted $C_{1-60}$ haloalkyl, a substituted or unsubstituted $C_{1-60}$ thioalkyl, a substituted or unsubstituted $C_{1-60}$ alkoxy, a substituted or unsubstituted $C_{1-60}$ haloalkoxy, a substituted or unsubstituted $C_{3-60}$ cycloalkyl, a substituted or unsubstituted $C_{1-60}$ alkenyl, a substituted or unsubstituted $C_{6-60}$ aryl, a substituted or unsubstituted $C_{6-60}$ aryloxy, or a substituted or unsubstituted $C_{2-60}$ heteroaryl containing at least one of O, N, Si and S; and n and m are each independently an integer from 1 to 10000.

2. The triblock copolymer according to claim 1, wherein:
the triblock copolymer comprises 0.01% by weight or more and less than 100% by weight of the poly(3-hydroxypropionate) block of Chemical Formula 1.

3. The triblock copolymer according to claim 1, wherein:
the triblock copolymer has a weight average molecular weight of 10,000 to 400,000.

4. A method for preparing a triblock copolymer, comprising:
subjecting a lactide monomer to a ring-opening polymerization in the presence of a poly(3-hydroxypropionate) initiator having hydroxy groups at both ends of the following Chemical Formula 2 to prepare a triblock copolymer,
wherein the ring-opening polymerization is performed by bulk polymerization:

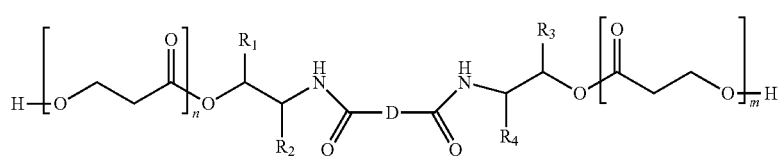

Chemical Formula 2 wherein in Chemical Formula 2:
D is a substituted or unsubstituted $C_{1-10}$ alkylene; a substituted or unsubstituted $C_{6-60}$ arylene; or a substituted or unsubstituted $C_{2-60}$ heteroarylene containing at least one heteroatom selected from the group consisting of O, N, Si and S;

$R_1$ to $R_4$ are each independently hydrogen, halogen, hydroxyl, cyano, nitrile, nitro, amino, a substituted or unsubstituted $C_{1-60}$ alkyl, a substituted or unsubstituted $C_{1-60}$ haloalkyl, a substituted or unsubstituted $C_{1-60}$ thioalkyl, a substituted or unsubstituted $C_{1-60}$ alkoxy, a substituted or unsubstituted $C_{1-60}$ haloalkoxy, a substituted or unsubstituted $C_{3-60}$ cycloalkyl, a substituted or unsubstituted $C_{1-60}$ alkenyl, a substituted or unsubstituted $C_{6-60}$ aryl, a substituted or unsubstituted $C_{6-60}$ aryloxy, or a substituted or unsubstituted $C_{2-60}$ heteroaryl containing at least one of O, N, Si and S; and n and m are each independently an integer from 1 to 10000.

5. The method according to claim 4, wherein:
the poly(3-hydroxypropionate) initiator having hydroxy groups at both ends has a weight average molecular weight of 5,000 to 50,000.

6. The method according to claim 4, wherein:
the poly(3-hydroxypropionate) initiator having hydroxy groups at both ends is present in an amount of 0.01 to 100 parts by weight, based on 100 parts by weight of the lactide monomer.

7. The method according to claim 4, further comprising:
subjecting 3-hydroxypropionate to condensation polymerization to prepare a poly(3-hydroxypropionate) oligomer; and
reacting the poly(3-hydroxypropionate) oligomer with one or more compounds selected from the group consisting of bisoxazoline-based compounds and diol-based compounds to prepare the poly(3-hydroxypropionate) initiator having hydroxy groups at both ends.

8. The method according to claim 7, wherein:
the bisoxazoline-based compound has the following Chemical Formula 3:

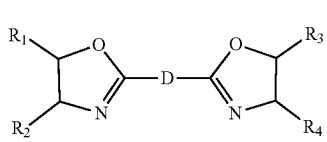

Chemical Formula 3 wherein in Chemical Formula 3:
D is a substituted or unsubstituted $C_{1-10}$ alkylene; a substituted or unsubstituted $C_{6-60}$ arylene; or a substituted or unsubstituted $C_{2-60}$ heteroarylene containing at least one heteroatom selected from the group consisting of O, N, Si and S;

$R_1$ to $R_4$ are each independently hydrogen, halogen, hydroxyl, cyano, nitrile, nitro, amino, a substituted or unsubstituted $C_{1-60}$ alkyl, a substituted or unsubstituted $C_{1-60}$ haloalkyl, a substituted or unsubstituted $C_{1-60}$ thioalkyl, a substituted or unsubstituted $C_{1-60}$ alkoxy, a substituted or unsubstituted $C_{1-60}$ haloalkoxy, a substituted or unsubstituted $C_{3-60}$ cycloalkyl, a substituted or unsubstituted $C_{1-60}$ alkenyl, a substituted or unsubstituted $C_{6-60}$ aryl, a substituted or unsubstituted $C_{6-60}$ aryloxy, or a substituted or unsubstituted $C_{2-60}$ heteroaryl containing at least one of O, N, Si and S; and n and m are each independently an integer from 1 to 10000.

9. The method according to claim 4, wherein:
the ring-opening polymerization is performed in the presence of one or more catalysts selected from the group consisting of an organometallic complex catalyst and an organic catalyst.

10. The method according to claim 9, wherein:
the organometallic complex catalyst is a catalyst of the following Chemical Formula 4:

$$MA^1_p A^2_{2-p}$$ Chemical Formula 4 wherein in Chemical Formula 4:
M is Al, Mg, Zn, Ca, Sn, Fe, Y, Sm, Lu, Ti or Zr;
p is an integer from 0 to 2; and
$A^1$ and $A^2$ are each independently an alkoxy or carboxyl group.

11. The method according to claim 10, wherein:
the $MA^1_p A^2_{2-p}$ is tin (II) 2-ethylhexanoate ($Sn(Oct)_2$).

12. The method according to claim 9, wherein:
the one or more catalysts is present in an amount of 0.01 to 10 mol % based on 100 mol % of the lactide monomer.

13. The method according to claim 4, wherein:
the ring-opening polymerization is performed at 150 to 200° C. for 5 to 10 hours.

* * * * *